United States Patent
Biswas et al.

(10) Patent No.: US 9,513,750 B2
(45) Date of Patent: Dec. 6, 2016

(54) ASYMMETRICAL LINK AGGREGATION

(71) Applicant: International Business Machines Corporation, Armonk, NY (US)

(72) Inventors: Amitabha Biswas, San Jose, CA (US); Jayakrishna Kidambi, San Jose, CA (US); Gang Tang, Wuxi (CN); Zi Jin Tao, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 14/228,154

(22) Filed: Mar. 27, 2014

(65) Prior Publication Data

US 2014/0294010 A1    Oct. 2, 2014

(30) Foreign Application Priority Data

Mar. 29, 2013   (CN) .......................... 2013 1 0108565

(51) Int. Cl.
| | |
|---|---|
| *H04W 4/00* | (2009.01) |
| *H04L 12/56* | (2006.01) |
| *H04L 12/28* | (2006.01) |
| *G06F 3/044* | (2006.01) |
| *H04L 12/709* | (2013.01) |

(52) U.S. Cl.
CPC ............ *G06F 3/044* (2013.01); *H04L 45/245* (2013.01); *Y02B 60/33* (2013.01)

(58) Field of Classification Search
CPC ........ H04L 45/245; H04L 45/56; H04L 49/00; H04L 49/356; H04L 49/70; Y02B 60/33
USPC ................................................. 370/392–393
See application file for complete search history.

(56) References Cited

U.S. PATENT DOCUMENTS

| | | | |
|---|---|---|---|
| 6,553,029 B1 * | 4/2003 | Alexander ............ | H04L 49/351 370/389 |
| 6,721,334 B1 * | 4/2004 | Ketcham ................ | H04L 49/90 370/465 |
| 7,002,955 B1 * | 2/2006 | Kanuri ................ | H04L 12/4625 370/389 |

(Continued)

FOREIGN PATENT DOCUMENTS

WO     WO2012037783      3/2012

OTHER PUBLICATIONS

Mysore et al., "PortLand: A Scalable Fault-Tolerant Layer 2 Data Center Network Fabric," SIGCOMM '09, Aug. 17-21, 2009, pp. 39-50.

(Continued)

*Primary Examiner* — Khaled Kassim
*Assistant Examiner* — Berhanu Belete
(74) *Attorney, Agent, or Firm* — Zilka-Kotab, PC

(57) ABSTRACT

According to one embodiment, an apparatus and method for asymmetrical link aggregation is disclosed, wherein the method is implemented in an access switch, the access switch connects to at least two aggregation switches through a first set of ports and respective links, the access switch connects to an external network through a second set of ports, and the at least two aggregation switches connects to an internal network, the method comprising: in response to receiving a frame from one of the second set of ports, selecting one of the first set of ports based on the source address of the frame; and sending the frame using the selected one of the first set of ports.

19 Claims, 15 Drawing Sheets

(56) References Cited

U.S. PATENT DOCUMENTS

| | | | | |
|---|---|---|---|---|
| 7,099,325 B1* | 8/2006 | Kaniz | ............... | H04L 29/12009 370/392 |
| 7,478,173 B1* | 1/2009 | Delco | ................ | H04L 12/2865 709/250 |
| 8,204,061 B1 | 6/2012 | Sane et al. | | |
| 2002/0131437 A1* | 9/2002 | Tagore-Brage | ......... | H04L 45/00 370/419 |
| 2005/0007962 A1* | 1/2005 | Nam | ................ | H04L 29/12018 370/252 |
| 2007/0280258 A1* | 12/2007 | Rajagopalan | ......... | H04L 45/245 370/395.3 |
| 2008/0068985 A1* | 3/2008 | Mieno | .................... | H04L 12/66 370/217 |
| 2008/0151887 A1* | 6/2008 | Foschiano | ........... | H04L 63/1466 370/389 |
| 2009/0141731 A1* | 6/2009 | Bitar | .................. | H04L 12/5695 370/412 |
| 2009/0207742 A1* | 8/2009 | Suzuyama | ............ | H04L 12/462 370/249 |
| 2010/0215042 A1* | 8/2010 | Sato | ..................... | H04L 12/413 370/392 |
| 2011/0103396 A1* | 5/2011 | Cardona | ............... | H04L 45/245 370/422 |
| 2011/0182289 A1* | 7/2011 | Raman | .................... | H04L 12/66 370/356 |
| 2011/0228767 A1* | 9/2011 | Singla | .................... | H04L 49/00 370/389 |
| 2012/0033669 A1 | 2/2012 | Mohandas et al. | | |
| 2012/0033672 A1* | 2/2012 | Page | ..................... | H04L 45/245 370/395.53 |
| 2012/0033678 A1* | 2/2012 | Page | ....................... | H04L 45/28 370/401 |
| 2012/0134262 A1 | 5/2012 | Licardie et al. | | |
| 2012/0182866 A1 | 7/2012 | Vinayagam et al. | | |
| 2012/0210039 A1 | 8/2012 | Cardona et al. | | |
| 2012/0230182 A1* | 9/2012 | Southworth | ........ | H04L 49/3009 370/217 |
| 2012/0250695 A1* | 10/2012 | Jia et al. | ....................... | 370/400 |

OTHER PUBLICATIONS

Shimazu et al., "Novel Sleep Control for EPON Optical Line Terminal employing Layer-2 Switch Functions," IEEE Communications Society, IEEE Globecom 2010 proceedings, pp. 1-1-1-5.

Mahapatra et al., "Load Balancing Mechanisms in Data Center Networks," the 7th Int. Conf. & Expo on Emerging Technologies for a Smarter World (CEWIT), 2010, pp. 1-6.

* cited by examiner

ASYMMETRICAL LINK AGGREGATION

RELATED APPLICATIONS

This application claims priority to Chinese Patent Application No. 201310108565.7, filed Mar. 29, 2013, which is herein incorporated by reference.

BACKGROUND

The present invention generally relates to the field of data processing, particularly to link aggregation, and more particularly to an apparatus and method for asymmetrical link aggregation.

Link aggregation refers to various methods that combine a plurality of parallel network links together to increase the bandwidth dramatically over a single link and to provide redundancy in an event of link failure. These methods include the Link Aggregation Control Protocol (LACP) for Ethernet defined in IEEE 802.1ax and a number of proprietary solutions.

For example, in the link aggregation of IEEE 802.1ax, a plurality of physical links between a plurality of ports of two participating systems may be aggregated and represent a single logical link for each of the systems. The traffic on this logical link is distributed among the available physical links according to a distribution algorithm. Such a logic construct can avoid the participating systems sending any frame back into the logical link, thus breaking the loop that actually exists.

To further increase the bandwidth and system resilience, it is proposed that not only a plurality of physical links between a plurality of ports of one pair of systems may be aggregated together, but also a plurality of physical links between a plurality of ports of a plurality of pairs of systems may also be aggregated together. For example, in a data center, each access switch usually connects to two aggregation switches. Thus, the two or more physical links between the access switch and the two aggregation switches may be aggregated, so as to further increase the bandwidth and provide redundancy. In this way, for example, if one aggregation switch fails, the access switch can still use the other aggregation switch and the physical link therebetween to communicate. Since there may also be a link between the two aggregation switches, a loop may be formed in the network topology. Therefore, the Spanning Tree Protocol (STP) running on the switches is used to block the connection on one side to break the loop. However, this will reduce the available bandwidth between the access switch and the aggregation switches by 50%. FIG. 1 shows a schematic diagram illustrating using the STP to break the loop in the network topology formed by an access switch and two aggregation switches. As shown, an access switch connects to two aggregation switches. By using the STP on the switches, the connection between the access switch and one of the aggregation switches is blocked, thus reducing the available bandwidth between the access switch and the aggregation switches by 50%.

A number of implementations and methods have been proposed to provide full utilization of bandwidth while at the same time providing sufficient redundancy and resilience. Known solution include IEEE's distributed link aggregation group (DLAG) proposal, IBM System Networking's virtual link aggregation group (vLAG), Cisco's vPC, Arista Network's MLAG, Extreme Networks' M-LAG, etc.

These solutions all try to accomplish the above goal by running distributed link aggregation on the two aggregation switches to form an illusion of a single switch, at least from the point of view of the link aggregation partner. FIG. 2 shows a schematic diagram of distributed link aggregation. As shown, an access switch connects to two aggregation switches. By running a distributed link aggregation protocol among the access switch and the two aggregation switches, the two links between the access switch and the two aggregation switches appear to be a single link. That is, from the point of view of the access switch, the two links form a link aggregation group (LAG), while from the point of view of the aggregation switches, the two links form a distributed link aggregation group.

These solutions have the following drawbacks:

1. The approach of running distributed link aggregation involves various synchronization and switching when the "single switch" forms and breaks down. This greatly increases the complexity of the design, brings in additional processing load, and is probably problematic.

2. These solutions always impact the aggregation switches more than forming the illusion. For example, some solutions disable the MAC learning on the inter-switch link (ISL) when the illusion forms. This increases the complexity for the user to understand the whole affection and deploy the network.

3. It is almost impossible to have switches from different vendors form an illusion.

4. The illusion cannot extend to cross more than two aggregation switches.

It can be seen that there is a need for an improved solution of link aggregation in the field.

BRIEF SUMMARY

In one aspect of the present invention, there is provided a method for asymmetrical link aggregation, wherein the method is implemented in an access switch, the access switch connects to at least two aggregation switches through a first set of ports and respective links, the access switch connects to an external network through a second set of ports, and the at least two aggregation switches connect to an internal network, the method including: in response to receiving a frame from one of the second set of ports, selecting one of the first set of ports based on the source address of the frame, and sending the frame using the selected one of the first set of ports.

In another aspect of the present invention, there is provided an apparatus for asymmetrical link aggregation, wherein the apparatus is implemented in an access switch, the access switch connects to at least two aggregation switches through a first set of ports and respective links, the access switch connects to an external network through a second set of ports, and the at least two aggregation switches connects to an internal network, the apparatus including: logic configured to, in response to receiving a frame from one of the second set of ports, select one of the first set of ports based on the source address of the frame, and logic configured to send the frame using the selected one of the first set of ports.

Advantages of the present invention include at least one of the following:

1. It does not need to run distributed link aggregation or a related protocol, lowering the complexity of design; it has no extra synchronization, with extremely low processing load; it does not change any behavior of the aggregation switches, and is implemented only on the access switch, and can be easily deployed by users.

2. The access switch may connect to more than two aggregation switches from different vendors, and make all the links fully utilized.

3. Symmetrical load balancing is realized naturally.

BRIEF DESCRIPTION OF THE SEVERAL VIEWS OF THE DRAWINGS

The above and other objects, features and advantages of the present invention will become more apparent through the more detailed description of exemplary implementations of the present invention below in conjunction with the accompanying drawings, wherein like reference numerals generally refer to like components throughout.

DETAILED DESCRIPTION

Figure 1:
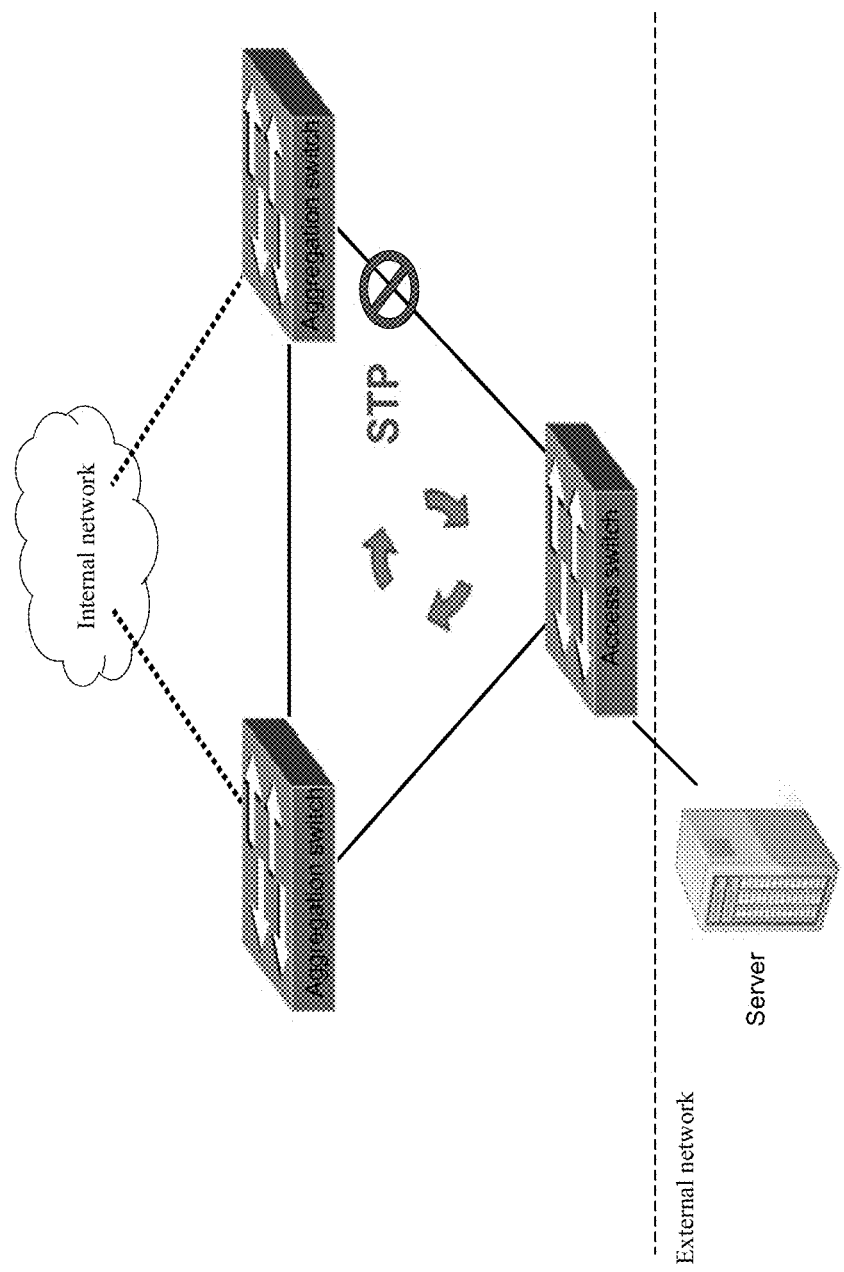
FIG. 1 is a schematic diagram illustrating using Spanning Tree Protocol (STP) to break the loop in a network topology formed by an access switch and two aggregation switches.
Figure 2:
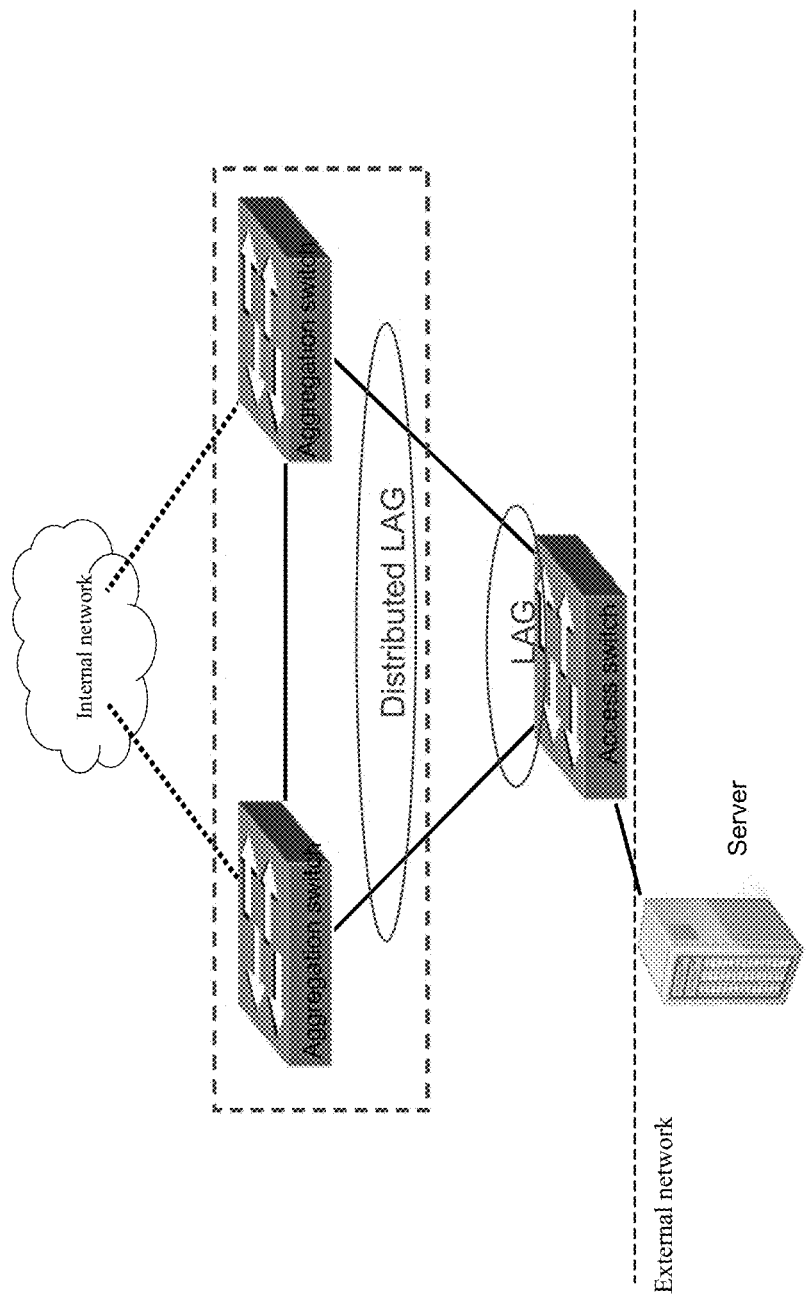
FIG. 2 is a schematic diagram of distributed link aggregation.

Preferred embodiments will be described below with reference to the drawings. While preferred embodiments are illustrated in the drawings, it should be understood that the present invention can be implemented in various forms, not limited to the embodiments described here. On the contrary, these embodiments are provided to make the invention more thorough and complete, and enable the scope of the present invention to be fully conveyed to those skilled in the art.

Figure 3A:
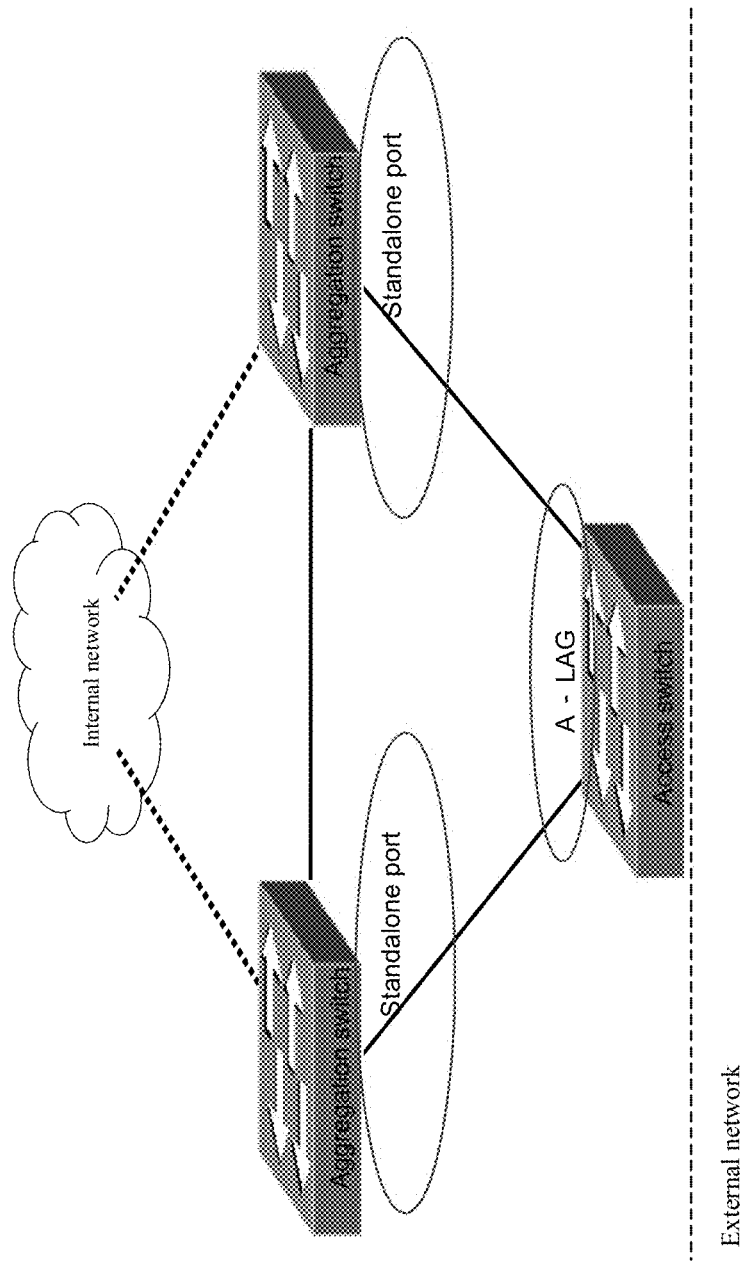
FIG. 3A illustrates a typical asymmetrical link aggregation (A-LAG) topology according to one embodiment.
Figure 3B:
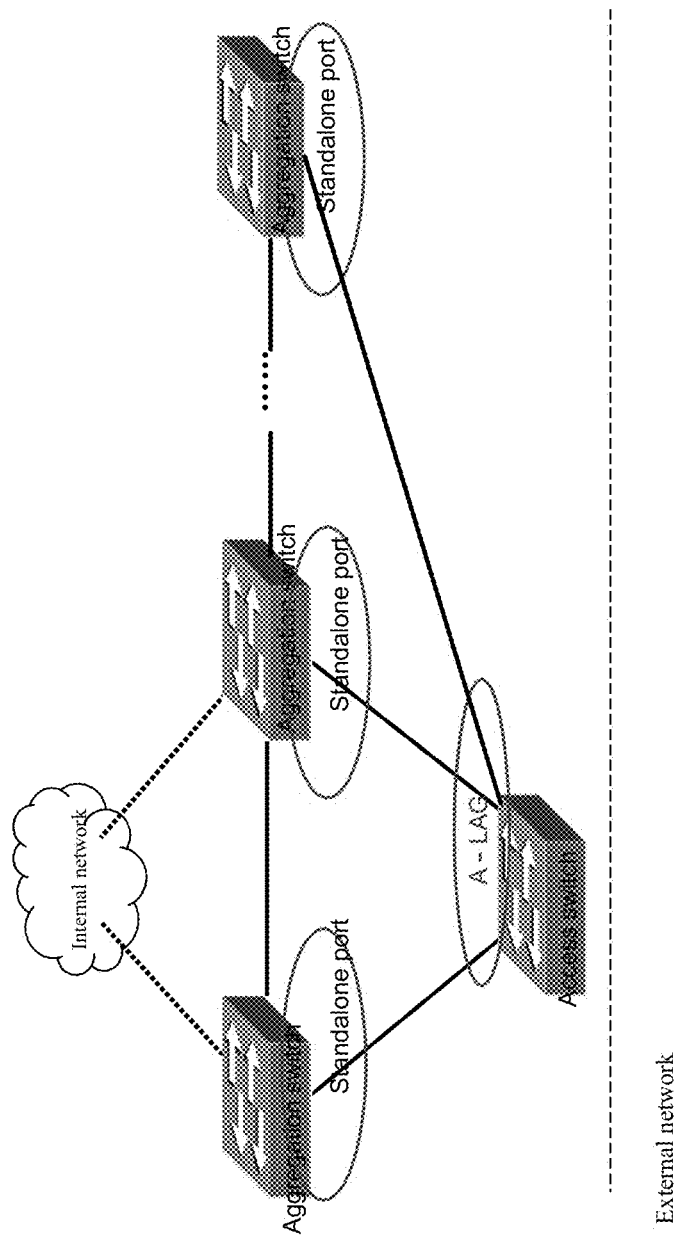
FIG. 3B illustrates another typical A-LAG topology according to one embodiment.
Figure 3C:
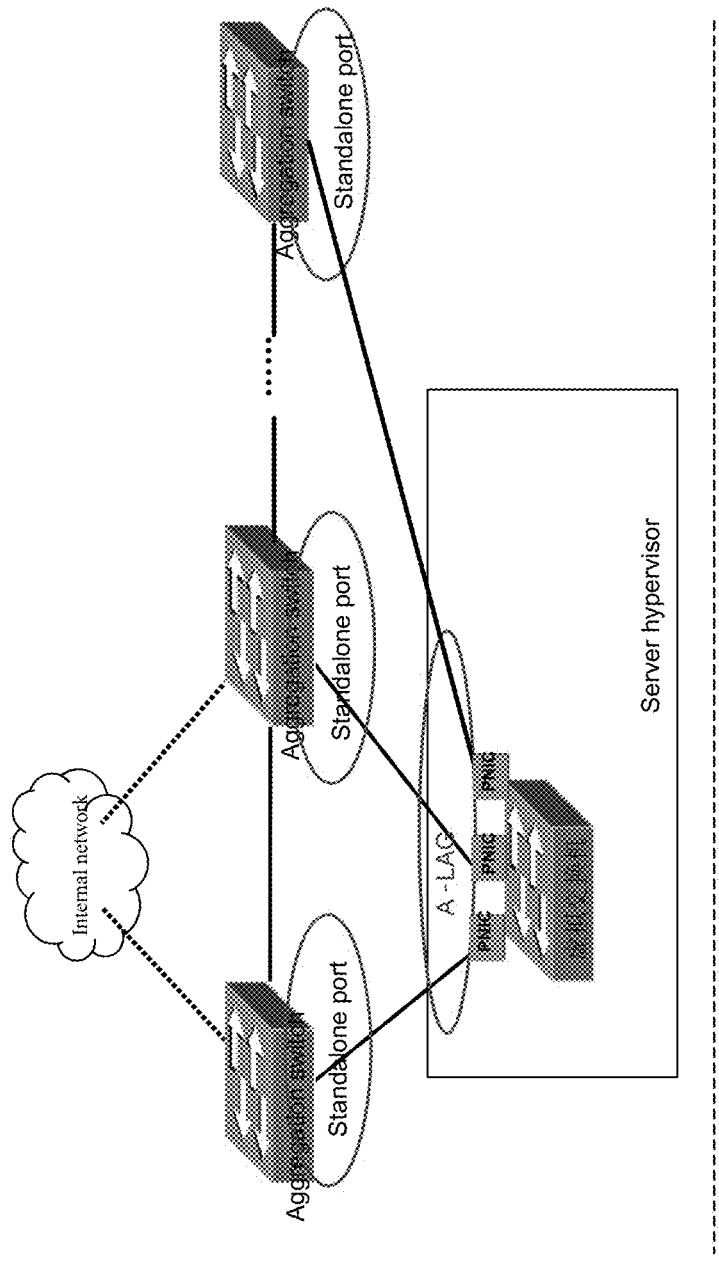
FIG. 3C illustrates a further typical A-LAG topology according to one embodiment.

The present invention proposes a special link aggregation for connecting a plurality of systems, which may be referred to as asymmetrical link aggregation (A-LAG). All the links of A-LAG transmit traffic actively. FIG. 3A illustrates a typical A-LAG topology according to an embodiment, wherein, an access switch connects to two aggregation switches through two links and A-LAG ports respectively, and connects to an external network through a non A-LAG port; and the two aggregation switches also connect to each other through a link, and the two aggregation switches connect to an internal network. The drawings of other embodiments also have such typical connections, which will not be repeated below. FIG. 3B illustrates another typical A-LAG topology according to an embodiment, wherein, an access switch connects to more than two aggregation switches through more than two links respectively, and adjacent aggregation switches also connect to each other through a link. FIG. 3C illustrates yet another typical A-LAG topology according to an embodiment, wherein, the access switch is not a physical switch, but a virtual switch running under a server hypervisor, which virtual switch similarly connects to more than two aggregation switches through more than two links, and adjacent aggregation switches also connect to each other through a link. In the above topologies, the access switch may connect to the external network through one or more ports, and the access switches may connect to the internal network, such as a data center, through their ports. Link aggregation among two or more links is implemented only on the access switch, while the aggregation switches are not aware of the link aggregation, and treat the physical links as individual links. The access switches may be ordinary aggregation switches, and have no other requirements than having the basic OSI layer 2 switching function. Since the systems at the two ends of the links have different views, it may be referred to as asymmetrical link aggregation (A-LAG). The system having the aggregation links may be referred to as an A-LAG system; the link aggregation group may be referred to as A-LAG; the systems at the other end not aware of the aggregation may be referred to as A-LAG partner systems; the links between the A-LAG system and the A-LAG partner systems may be referred to as A-LAG links. One A-Lag system may connect to a plurality of partner systems. Generally, an access switch operates as an A-LAG system, and aggregation switches operate as A-LAG partner systems. The A-LAG system may be a physical switch or a virtual switch purely based on software. Of course, it is also contemplated that other switches or other network devices operate as the A-LAG system and A-LAG partner systems.

When the access switch receives a frame from the external network, the access switch (e.g., a frame distributor therein) may use a distribution algorithm to distribute the frame among the group of links forming the A-LAG. In one embodiment, the distribution algorithm should ensure that frames with a given source MAC address be sent to a single link, that is, all frames with this source MAC address should be sent to this same link. The distribution algorithm may use various known or yet unknown methods to ensure that frames with a given source MAC address be sent to a single link. For example, the distribution algorithm may perform a hashing operation on the source MAC address to obtain a corresponding port number, thus determining the link that the port connects to. In one embodiment, the access switch may also store different source MAC addresses and obtained corresponding port numbers in a source MAC address-egress port number mapping table. Thus, when the access switch receives a frame with the source MAC address again, it may omit the step of calculating a port number based on the source MAC address, and directly obtain the corresponding port number from the table, and send the frame to the corresponding aggregation switch through the port and the link that it connects to. For all kinds of frames (unicast, broadcast, unknown unicast frames, etc.), the distribution algorithm may send them to a single link based on their source MAC addresses.

As known by those skilled in the art, when the aggregation switch at the other end of the link receives the frame with the given source MAC address, as a normal switch operation (e.g., using a single port), it may create in its MAC address table an entry including the source MAC address and the port number of the port from which the frame was received (if the entry does not exist yet), i.e., MAC address learning, so that when the aggregation switch receives a frame with its destination MAC address being the source MAC address from the internal network, it may determine the port number by looking up the entry in the MAC address table, and send the frame through the port over the link to the access switch. Since the frames with the same source address have been sent over the single link, this avoids the situation that when different frames with the same source address are sent over different links, an aggregation switch both receives a frame through one port from the access switch and receives the frame through another port from the other aggregation switch, thus creating conflicting entries with the same source MAC address but different port numbers in its MAC address table, i.e., generating MAC address flapping. As known by those skilled in the art, when MAC address flapping happens, if the switch receives a frame with its destination MAC address being the source address, since this MAC address corresponds to two different port numbers, the switch will not send the frame, and will discard it; alternatively, the switch will continuously relearn the MAC address, thus causing performance degradation. Therefore, the access switch according to one embodiment uses the distribution algorithm to avoid MAC address flapping being generated at the aggregation switches as well as lost frames or performance degradation caused thereby.

Once the A-LAG ensures that frames with a given source address are sent over a single link, usually symmetrical load balancing will be realized naturally. This is because frames with different source addresses will be distributed among the different links based on their source addresses, thus in the case that a large number of frames with different source addresses are forwarded, load balancing may be formed naturally. Alternatively, the distribution algorithm may be chosen as one enabling a large number of frames with different source addresses to be distributed largely uniformly among different ports. Additionally, this load balancing is symmetrical, that is, a frame with a given source address in the forward flow and a corresponding frame in the reverse flow will be transmitted over the same link. The forward flow comprises frames sent from the access switch to an aggregation switch, which frames are identified by their source addresses. The reverse flow comprises frames received at the access switch from an aggregation switch, which frames are identified by their destination addresses. As stated above, when an aggregation switch receives a frame in the forward flow from the access switch, the aggregation switch may create an entry including the source address of the frame and the ingress port number (if the entry does not exist yet). And when the aggregation switch receives a frame with its destination address being the source address in the reverse flow from the internal network, the aggregation switch may determine the port number by looking up the entry in the MAC address, and send the frame in the reverse from to the access switch. In this way, the two-directional symmetrical load balancing is realized.

When A-LAG membership changes (e.g., adding a new aggregation switch and link or removing an aggregation switch or link) or the status of a member link changes (e.g., a link fails), the access switch can know the change immediately, and can use the distribution algorithm to select a new link for a frame in the forward flow based on the source address of the frame in the forward flow. However, before the new frame in the forward flow is sent to the aggregation switch through the newly selected link, the aggregation switch may not be aware of the change. This will cause a temporary interruption of the symmetrical load balancing. During this time, a frame in the reverse flow on a previously selected link may be lost due to being sent to the aggregation switch with the faulty A-LAG link. Therefore, when the access switch is aware of a change of the link selection for the A-LAG flow, the access switch may notify the aggregation switches to update their MAC address tables correspondingly. This may be realized by sending a fake frame with a corresponding source address over the newly selected link so that the aggregation switch may learn the source address and the port number into its MAC address table. The fake frame will not disturb the network. A reverse address resolution protocol (RARP) frame may be used as the type of the fake frame. For example, for each source MAC address in the source MAC address-egress port number mapping table described above, the access switch may use the distribution algorithm to recalculate a port number and update the entry in the table therewith, and then construct a fake frame with the source MAC address, and send it through the port with the recalculated port number over the corresponding link. In this way, when the aggregation switch at the other end of the link receives the fake frame, it may use the source MAC address included in the frame and the ingress port number to update its MAC address table, thus timely creating a new transmission route for frames in the reverse flow.

As known by those skilled in the art, when an aggregation switch receives a frame from the access switch, it will extract the destination MAC address included in the frame, looking up an entry including the MAC address in its MAC address table to obtain the port number corresponding to the MAC address, and send the frame through the port. This entry was created previously in the MAC address table through the MAC address learning mechanism when the aggregation switch received a frame in the reverse flow. If when the aggregation switch receives a frame from the access switch, no entry including the destination MAC address has been created yet in the MAC address table, that is, the aggregation switch encounters a Destination Lookup Failure (DLF), the aggregation switch will flood the frame to all the other ports apart from the ingress port. If the other aggregation switch receives the frame and also encounters DLF, it will also flood the frame all the other ports apart from its ingress port, thus this frame will return to the access switch through the link between the other aggregation switch and the access switch, that is, the access switch will receive a reflected frame. In addition, when an aggregation switch receives a broadcast frame from the access switch, it will also flood the frame to all the other ports apart from the ingress port. And when the other aggregation switch receives the broadcast frame, it will also flood the frame to all the other ports apart from its ingress port, thus this broadcast frame will return to the access switch through the link between the other aggregation switch and the access switch, that is, the access switch will receive a reflected frame.

Figure 4:
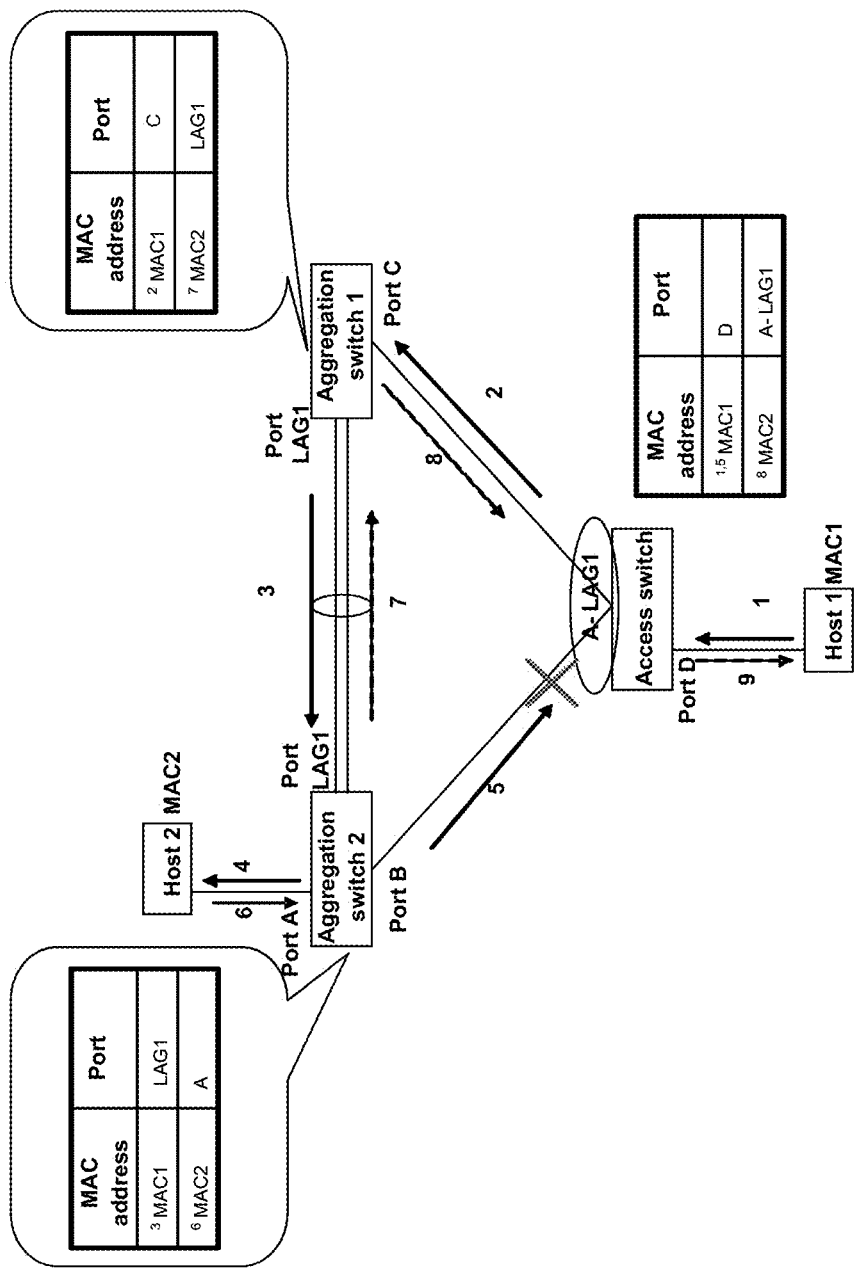
FIG. 4 illustrates a situation of forming a reflected frame due to a Destination Lookup Failure (DLF) at an aggregation switch.

FIG. 4 illustrates a situation of forming a reflected frame due to a DLF at an aggregation switch. As shown, in step 1, the access switch receives a frame through port D from host 1 with address MAC1, and creates an entry including MAC1 and port number D in its MAC address table through the MAC address learning mechanism. The access switch uses the distribution algorithm of the present invention to select port number A-LAG1 based on the source address MAC1 of the frame, and in step 2, sends the frame through the port to aggregation switch 1. Aggregation switch 1 receives the frame through its port C, and creates an entry including MAC1 and port number C in its MAC address table. In step 3, aggregation switch 1 sends the frame through its port LAG1 to aggregation switch 2. Aggregation switch 2, after receiving the frame, first creates an entry including MAC1 and its ingress port number LAG1 in its MAC address table, and then, since the destination MAC address of the frame cannot be found in its MAC address table, it floods the frame to every port (port A and port B) apart from the ingress port, that is, in step 4 sending the frame through port A to host 2 with address MAC2, and in step 5, sending the frame through port B back to the access switch, thus forming a reflected frame. If the access switch does not repress the reflected frame, it will created an entry including MAC1 and port number A-LAG1 in the MAC address table through the MAC address learning mechanism, thus conflicting with the previously created entry including MAC1 and port number D.

FIG. 4 also shows the transmission path of a frame in the reverse flow. In step 6, host 2 sends the frame with destination address MAC1 to aggregation switch 2. After receiving the frame, aggregation switch 2 creates an entry including MAC2 and port number A in its MAC address table, and then in step with 7, sends the frame through port LAG1 to aggregation switch 1 based on the entry including MAC1 and port number LAG1 in the MAC address table. After receiving the frame, aggregation switch 1 creates an entry including MAC2 and port number LAG1 in the MAC address table, and then in step 8, sends the frame through port C to the access switch based on the entry including MAC1 and port number C. The access switch, after receiving the frame, first creates an entry including MAC2 and port number A-LAG1 in the MAC address table, and then in step 9, sends the frame through port D to host 1 based on the entry including MAC1 and port D in the MAC address table.

In a typical network environment, the number of broadcast frames and DLFs are relatively small. Therefore, the number of reflected frames in the A-LAG is also relatively small. However, the reflected frames in the A-LAG must be detected and repressed, otherwise the MAC address of a host in the external network will be re-learnt onto a A-LAG port (i.e., a port connecting a link between the access switch and an aggregation switch), thus making the host unreachable to hosts in the internal network. Another case is that when a host migrates from one port to another port, the host MAC address learnt previously will be re-learnt onto the new port. This port may be a single physical port or represent a logical port of a LAG. For a physical port migration, it will take from several seconds to several minutes from when the host MAC address appeared last on the previous port until the host MAC address appears on the new port. For a virtual machine (VM) migration, such as VMware's VMotion, it will also take a time of several seconds. While in a typical network environment, the A-LAG reflected frame will be received within only several micro-seconds after receiving the original frame. Therefore, if the source address of a frame that appeared previously on a port of the switch appears in a frame received on another A-LAG port within a specific very short period of time, the frame may be determined to be a reflected frame. This frame will be discarded, not participating in MAC address learning, nor being sent. On the other hand, if the source address of a frame that appeared previously on a port appears in a frame received on another port after a relatively long time, it may be determined that the host's port migration has occurred, and thus normal MAC address re-learning and forwarding may be performed. The A-LAG reflected frame detection may be integrated into the MAC learning engine to avoid extra lookup.

Specifically, in one embodiment, a host movement disallow bit may be added into the MAC address table entry of the access switch. This bit is set to be 1 (or 0) when the MAC address table entry is created. Whenever the source address and ingress port of a received frame match an entry, the bit of the entry is also set. In addition, a routine periodically clear this bit of all the entries, and the period may be configurable to suit different scenarios. When the source address of a received frame matches an entry, while the ingress port is different from the port in the entry, and the bit is set, the frame may be determined to be a reflected frame and will be discarded, otherwise normal MAC learning and forwarding are performed. That is, when the bit is set, indicating that the host's port migration has been disallowed, and in this case if the source address of a received frame is the same as the source address in a MAC address table entry, while the port number is different, this indicates that the frame is a reflected frame; and when the bit is not set, indicating the host's port migration is allowed, and in this case if the source address of a received frame is the same as the source address in a MAC address table entry, while the port number is different, this indicates the this is caused by the host's port migration.

When the aggregation switch received a broadcast frame (in embodiments, multicast frames may be treated as broadcast frames) or a DLF frame from the internal network, it will flood the frame to all the links. Thus, the access switch will receive a copy of the frame from each A-LAG link, that is, receiving duplicated frames. The access switch should eliminate all the received duplicated frames. To this end, the access switch should receive broadcast frames or DLF frames from only one A-LAG member port, and discard the broadcast frames and DLF frames received from the other A-LAG member port(s). The port chosen to receive the frames may be referred to as the primary port. And only one primary port should exist in the access switch. For a multicast frame, the access switch may designate any one of the A-LAG member ports as the primary port, and only the multicast frames received on the primary port will be accepted and processed and forwarded normally (e.g., using a single port), while the multicast frames received on all the other A-LAG member ports will be discarded. For a unicast frame received from an A-LAG port, it may have been sent as a DLF frame by the aggregation switch, or sent as a unicast frame with a known destination address. If it is sent as a DLF frame, the access switch will receive a copy of the frame over each A-LAG link. If it is sent as a unicast frame with a known destination address, the access switch will only receive the frame over the link that the corresponding frame in the forward flow has used. It can be seen that in either case, the access switch will receive the frame over the link that the corresponding frame in the forward link has used. Therefore, in an embodiment of the present invention, the access switch will choose the port used by the frame in the forward flow as the primary port for the unicast frame, only receiving the copy of the frame received from this port, and discarding the copies of the frame received on all the other A-LAG ports. To this end, an ingress port blocking bitmap may be added to each table entry of the access switch. The ingress port blocking bitmap has a bit corresponding to each A-LAG port. After the access switch, for a received frame in the forward flow, has used the distribution algorithm to calculate the A-LAG port for forwarding the frame based on its source address, and created an entry including the source address of the frame and the ingress port number, it may add an ingress port blocking bitmap in the entry, with the bit corresponding to the calculated A-LAG port not set, and all the other bits corresponding to the other A-LAG ports set. When the access switch receives a unicast frame in the reverse flow, and the destination address corresponds to the source address of an entry in the MAC address table, if the bit in the ingress port blocking bitmap in the table entry corresponding to the ingress port of the frame is not set, indicating that the frame was received from the A-LAG port and link used by the frame in the forward flow, the frame is retained, and proceed and forwarded normally; if the bit in the ingress port blocking bitmap in the table entry corresponding to the ingress port of the frame is set, indicating that the frame is received from another A-LAG port and link, the frame is discarded. In addition, as known by those skilled in the art, there is usually an aging time for a MAC address table entry in the switch, and if no new frame with the same source address within the aging time is received, the entry will be deleted; this aging time is usually controlled by an aging timer. Thus, to ensure that when the access switch receives a frame in the reverse flow from an aggregation switch, the MAC address table entry including the destination address of the frame still exists so that its ingress port blocking bitmap may be used to determine whether the frame is a duplicated frame to be discarded, the aging timer in the access switch may be set to be longer than the aging timer in the aggregation switch.

Figure 5:
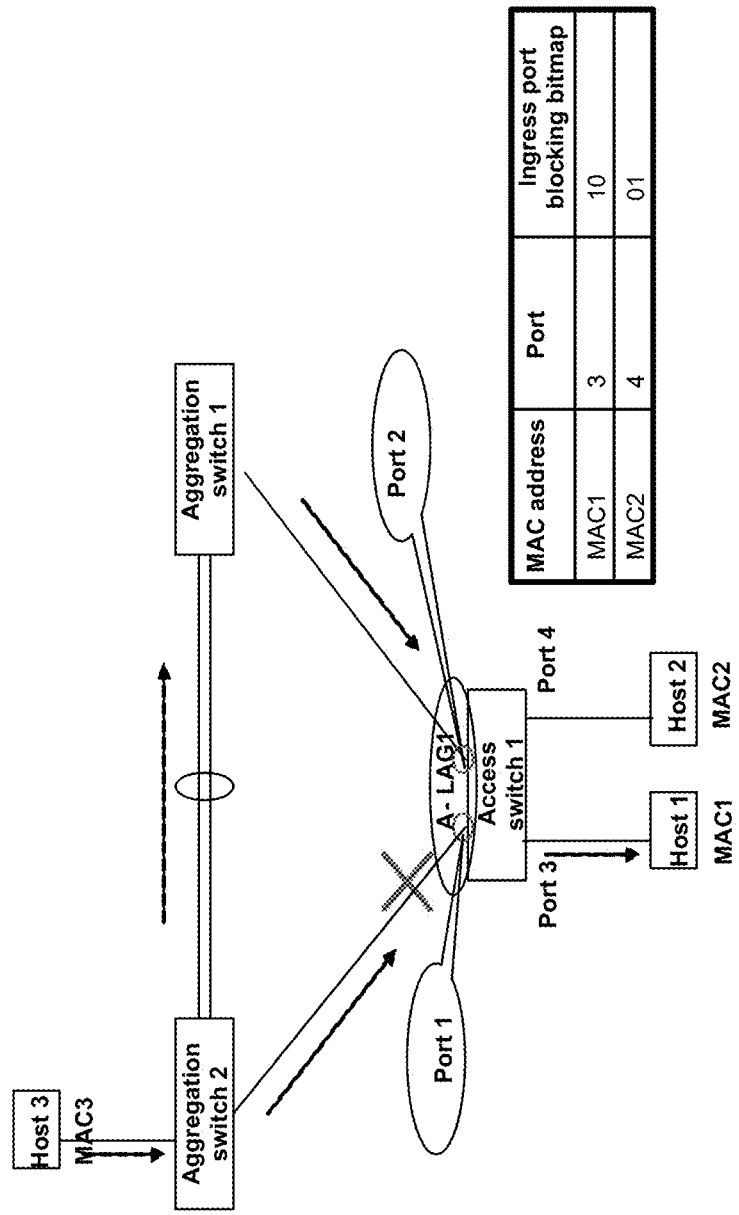
FIG. 5 illustrates an example of eliminating duplicated frames in the reverse flow using an ingress port block bitmap according to one embodiment.

FIG. 5 illustrates an example of eliminating duplicated frames in the reverse flow using the ingress port blocking bitmap according to one embodiment. As shown, when the access switch adds an entry including MAC1 and port number 3 in its MAC address table for a frame received through port 3 from host 1 with the MAC address MAC1, since the send port selected for the frame according to the distribution algorithm is port 2 in the A-LAG1 ports, the bit in the ingress port blocking bitmap of the entry corresponding to port number 2 is not set, and the bit corresponding to the other port, i.e., port 1, in the A-LAG ports is set. When the corresponding MAC address table entry in aggregation switch 2 has aged and been deleted, if aggregation switch 2 received a frame with the destination address being MAC1 of host 1 in the reverse flow, aggregation switch 2 will flood copies of the frame on all its ports, and aggregation switch 1, after receiving a copy of the frame, will forward it to the access switch, thus the access switch will receive two copies of the frame from both port 1 and port 2. For the copy received from port 1, since the bit corresponding to port 1 in the ingress port blocking bitmap in the entry including MAC1 is set, the copy of the frame will be discarded. And for the copy of the frame received from port 2, since the bit corresponding to port 2 in the ingress port blocking bitmap is not set, this copy of the frame will be processed and forwarded normally.

In fact, there may also be multiple links between one aggregation switch and the access switch, with the links being aggregated as a port-channel. For such a configuration, the ingress port blocking bitmap mechanism according to embodiments may still be used to eliminate duplicated frames in the reverse flow. In this case, the port-channel will be treated as a single link, and the multiple ports of the port-channel will be treated as a single port, which may be referred to as a port-channel-port (PCP). A frame received from any port of the port-channel will be viewed as being received from the port-channel. Then, the ingress port blocking bitmap map will be used on the PCP, instead of on a single port. That is, the ingress port blocking bitmap may include a bit corresponding to the PCP (or a bit corresponding to each port in the PCP), and when the PCP or any port therein is selected for forwarding a frame in the forward flow, the bit corresponding to the PCP (or each port therein) is not set, and the bits corresponding to all the other PCPs (or each port therein) are set. When a frame in the reverse flow is received from any port in the PCP, if the bit corresponding to the PCP (or the port) in the ingress port blocking bitmap in the entry including the destination address of the frame is set, the frame is discarded; if the bit corresponding to the PCP (or the port) in the ingress port blocking bitmap is not set, the frame is processed and forwarded normally.

Figure 6:
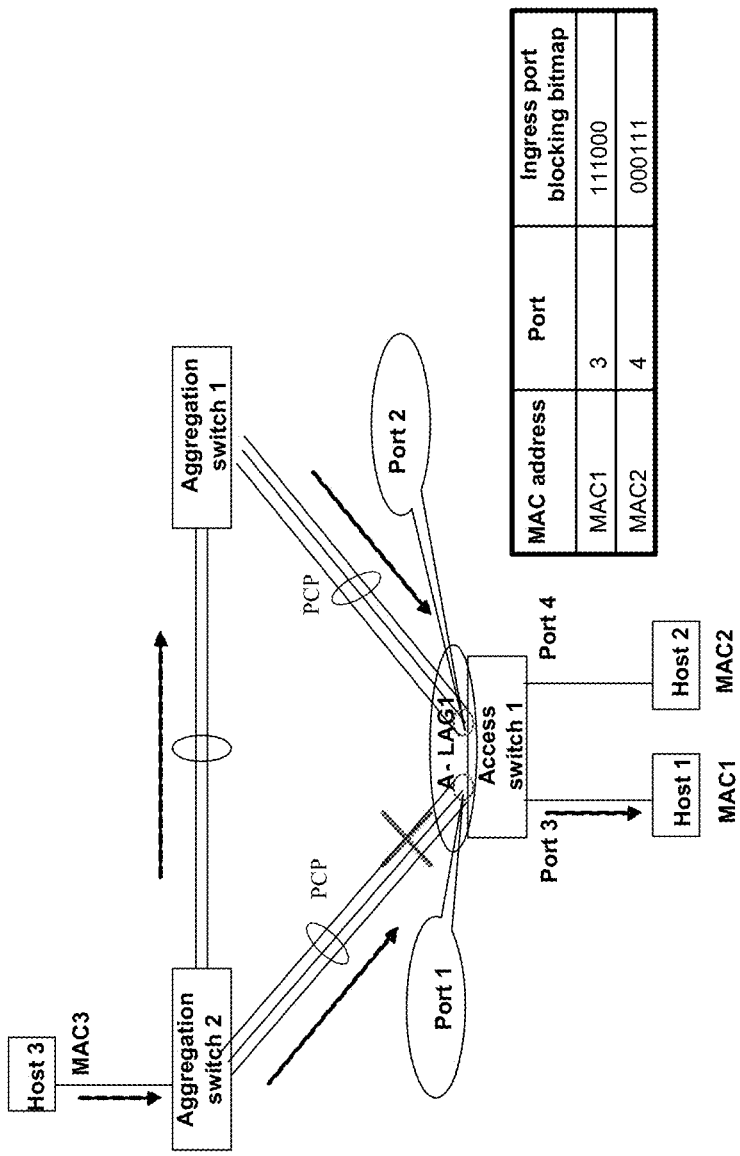
FIG. 6 illustrates an example of eliminating duplicate frames using an ingress port block bitmap for an A-LAG system including a port channel according to one embodiment.

FIG. 6 illustrates an example of eliminating duplicated frames using the ingress port blocking bitmap for an A-LAG system including port-channels according to one embodiment. As shown, port-channel 1 and port-channel 2 of the access switch are both a port-channel including three ports. The ingress port blocking bitmap of each MAC address table entry includes a bit corresponding to each port in the two port channels, and the bits in each port channel are commonly set as 0 or 1. When a frame with the destination address MAC1 in the reverse flow enters any port in port-channel 1, since the bit corresponding to each port in port-channel 1 in the ingress port blocking bitmap in the address table entry including MAC1 is set as 1, the frame will be discarded; and the frame entering any port in port-channel 2 will be accepted, and processed and forwarded normally, since the bits corresponding to this port-channel are set as 0.

In addition, the A-LAG system must also deal with the situation that the link between different aggregation switches (i.e., ISL) fails. In order to detect an ISL failure, in one embodiment, a beacon probe mechanism is employed. The beacon probe mechanism refers to periodically sending a special broadcast frame through an A-LAG member port (e.g., the primary port), the frame being unique among all the broadcast frames. When the ISL operates normally, the access switch will receives copies of the frame from all the other A-LAG member ports. And when the ISL fails, the access switch will not received copies of the frame from the other member ports apart from the primary port, and thereby the access switch may determine that the ISL fails. At this time, the access switch may treat the A-LAG links as individual ordinary links, and process and forward received frames normally as an ordinary switch does.

Figure 7:
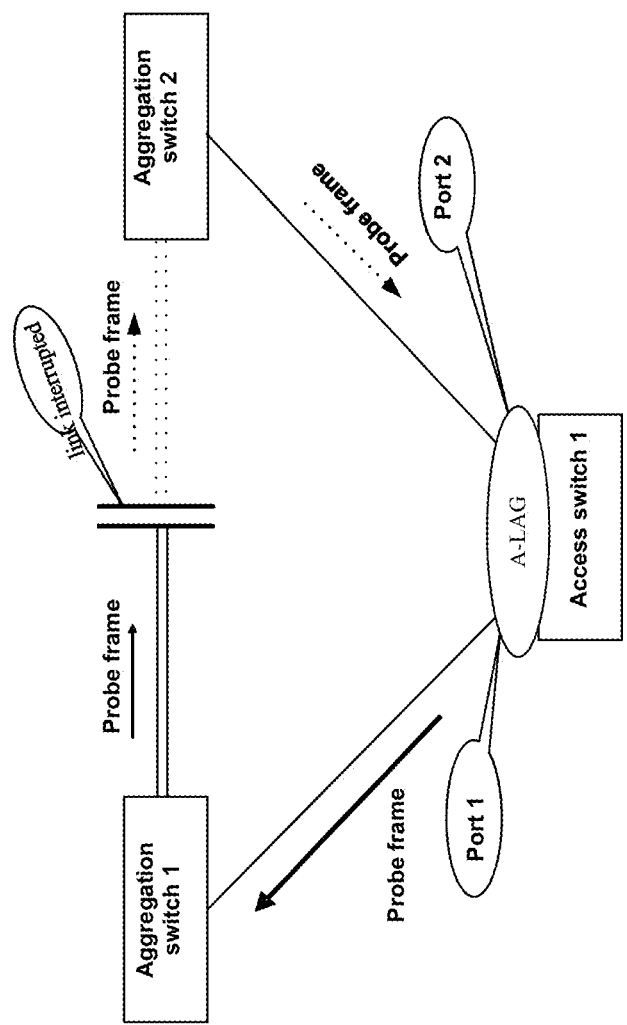
FIG. 7 is a schematic diagram illustrating using a beacon probe mechanism to detect an inter-switch link (ISL) failure according to one embodiment.

FIG. 7 is a schematic diagram illustrating detecting an ISL failure using the beacon probe mechanism according to one embodiment. As shown, in a normal situation, the access switch periodically sends a probe broadcast frame through its port 1 to aggregation switch 1, aggregation switch 1 sends a copy of the frame to aggregation switch 2, and aggregation switch 2 returns the copy of the frame to port 2 of the access switch. If an ISL failure occurs between aggregation switch 1 and aggregation switch 2, the copy of the frame will not be able to reach aggregation switch 2 from aggregation switch 1, thus the access switch will not receive the copy of the frame from port 2. At this time, the access switch may determine that an ISL failure has occurred, and thus may treat its links connecting the different aggregation switches as separate ordinary links, and perform normal frame processing and forwarding.

Figure 8:
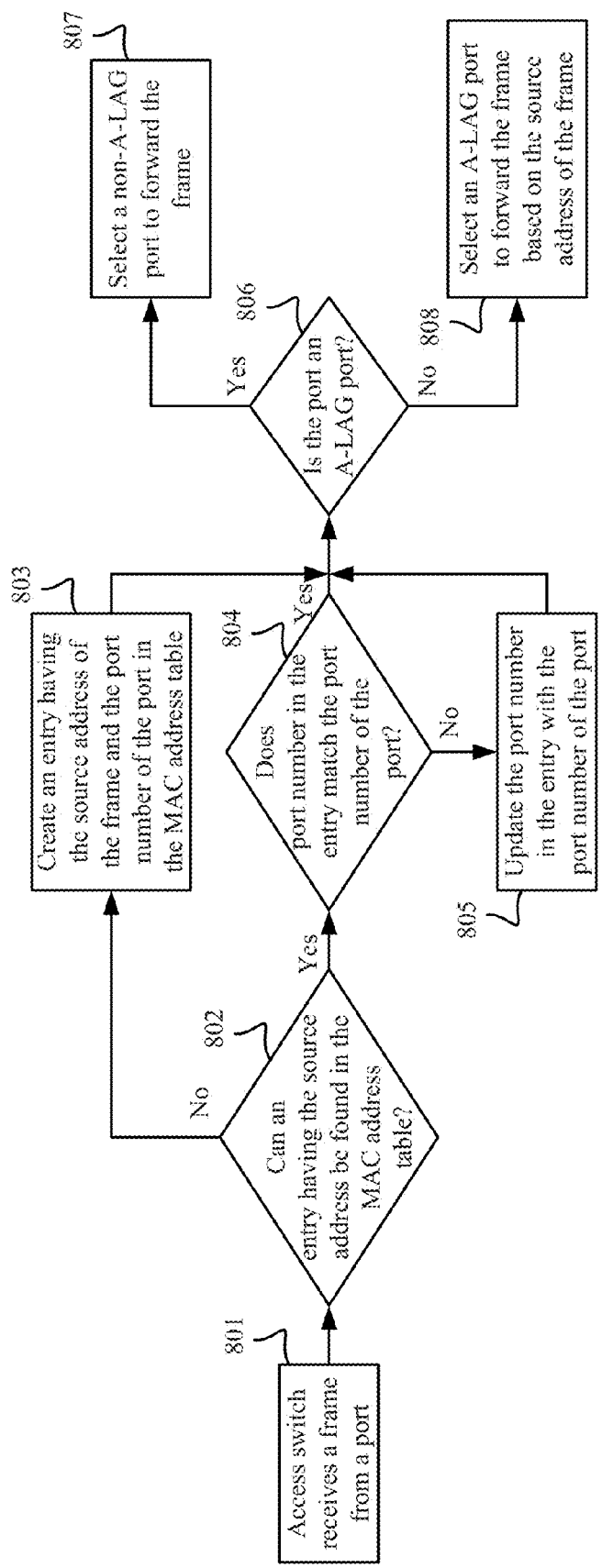
FIG. 8 is a schematic diagram illustrating a process performed by the access switch in response to receiving a frame according to one embodiment.

Referring to FIG. 8, a flow diagram of a process performed by the access switch in response to receiving a frame according to some embodiments is shown. As shown, in step 801, the access switch receives a frame from a port. Then in step 802, the access switch determines whether an entry including the source address of the frame can be found in its MAC address table. In response to the determination of No, in step 803, an entry including the source address of the frame and the port number of the port is created in the MAC address table, and then the process proceeds to step 806. In response to determining in step 802 that an entry including the source address of the frame can be found in its MAC address table, in step 804, the access switch further determines whether the port number in the entry found in the MAC address table matches the port number of the port. In response to determining that they match, the process proceeds to step 806; in response to determining that they do not match, the process proceeds to step 805. In step 805, the port number of the port is used to update the port number in the entry, then the process proceeds to step 806. In step 806, the access switch determines whether the port is an A-LAG port. In response to determining that the port is an A-LAG port, that is, the frame is a frame in the reverse flow from the internal network, the process proceeds to step 807, in which the access switch selects a non-A-LAG port (i.e., a port linking with the external network) to forward the frame. The access switch may select a non-A-LAG port to forward the frame based on the destination address of the frame, just like an ordinary switch. In response to determining in step 806 that the port from which the frame was received is a non A-LAG port, that is, the frame is a frame in the forward flow coming from the external network, the process proceeds to step 808, in which the access switch selects an A-LAG port to forward the frame based on the source address of the frame. The access switch may employ any distribution algorithm to select an A-LAG port based on the source address of the frame, such as hashing the source based on the source address of the frame, such as performing a hash operation on the source address of the frame to obtain a distinct port number, provided only that the distribution algorithm can ensure that the same port number may be obtained based on the same source address. Alternatively, the distribution algorithm may make a large number of frames with different source addresses to be distributed largely uniformly among different ports.

Figure 9:
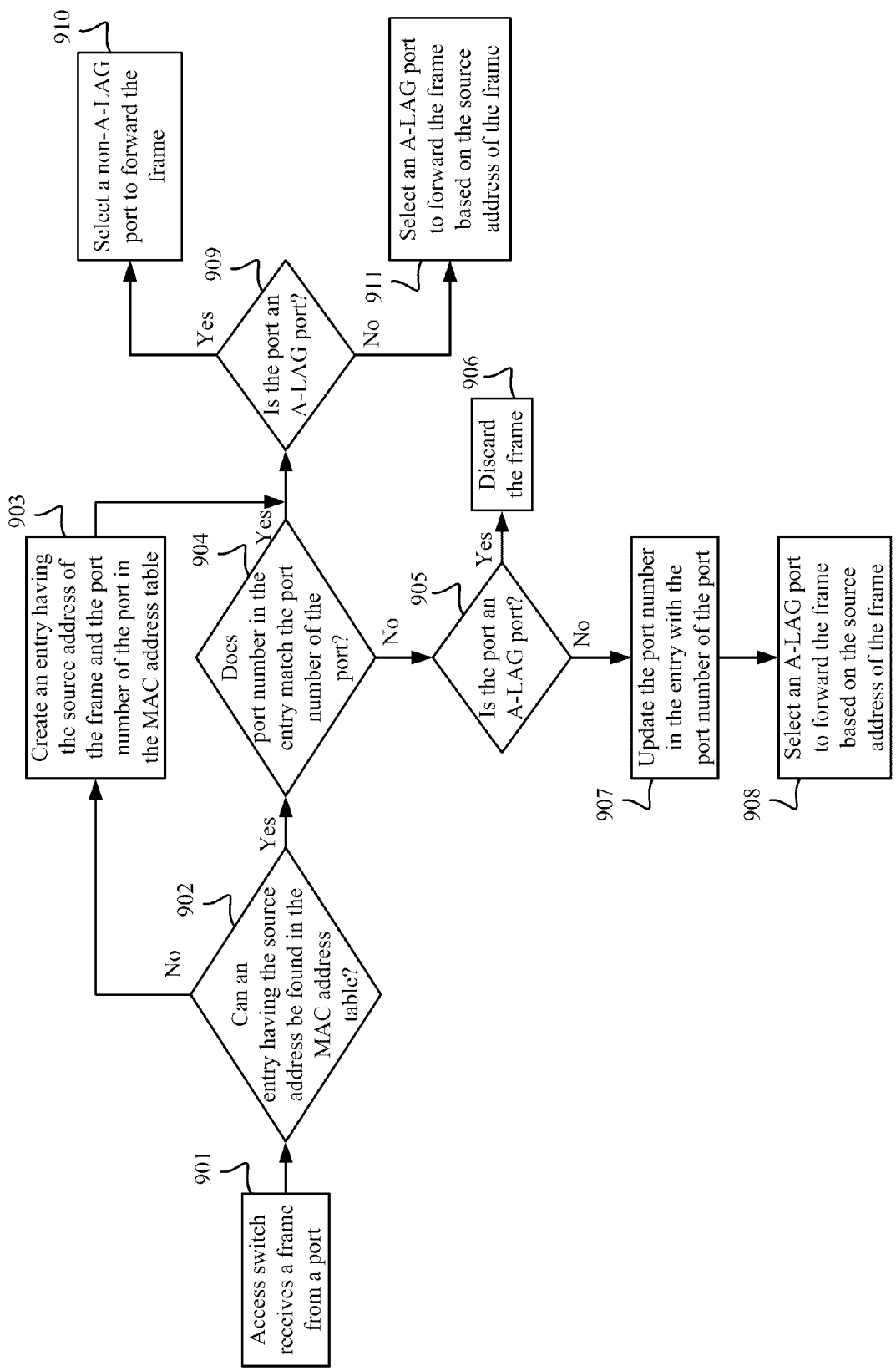
FIG. 9 is a schematic diagram illustrating a process performed by the access switch in response to receiving a frame according to another embodiment.

Referring to FIG. 9, a flow diagram of the process performed by the access switch in response to receiving a frame according to some other embodiments is shown. As shown, step 901, the access switch receives a frame from a port. Then in step 902, the access switch determines whether an entry including the source address of the frame can be found in its MAC address table. In response to the determination of No, in step 903, an entry including the source address of the frame and the port number of the port is created in the MAC address table, and then the process proceeds to step 909. In response to determining in step 902 that an entry including the source address of the frame can be found in its MAC address table, in step 904, the access switch further determines whether the port number in the entry found in the MAC address table matches the port number of the port. In response to determining that they match, the process proceeds to step 909; in response to determining that they do not match, the process proceeds to step 905. In step 909, the access switch determines whether the port is an A-LAG port. In response to determining that the port is an A-LAG port, the process proceeds to step 910, in which the access switch selects a non-A-LAG port to forward the frame. The access switch may select a non-A-LAG port to forward the frame based on the destination address of the frame, just like an ordinary switch. In response to determining in step 909 that the port from which the frame was received is a non A-LAG port, the process proceeds to step 911, in which the access switch selects an A-LAG port to forward the frame based on the source address of the frame, as described above in detail with respect to step 808. In step 905, it is determined whether the port from which the frame was received is an A-LAG port. In response to the determination of Yes, it may be determined that the frame is a reflected frame, thus in step 906, the frame is discarded, without being used to perform MAC address learning, nor being forwarded. In response to the determination in step 905 being No, that is, the frame is a frame in the forward flow entering the access switch from the external network, the process proceeds to step 907, in which the port number of the port from which the frame was received is used to update the port number in the MAC address table entry. Then, in step 908, an A-LAG port is selected based on the source address of the frame to forward the frame, as described above in detail with respect to step 808.

Figure 10:
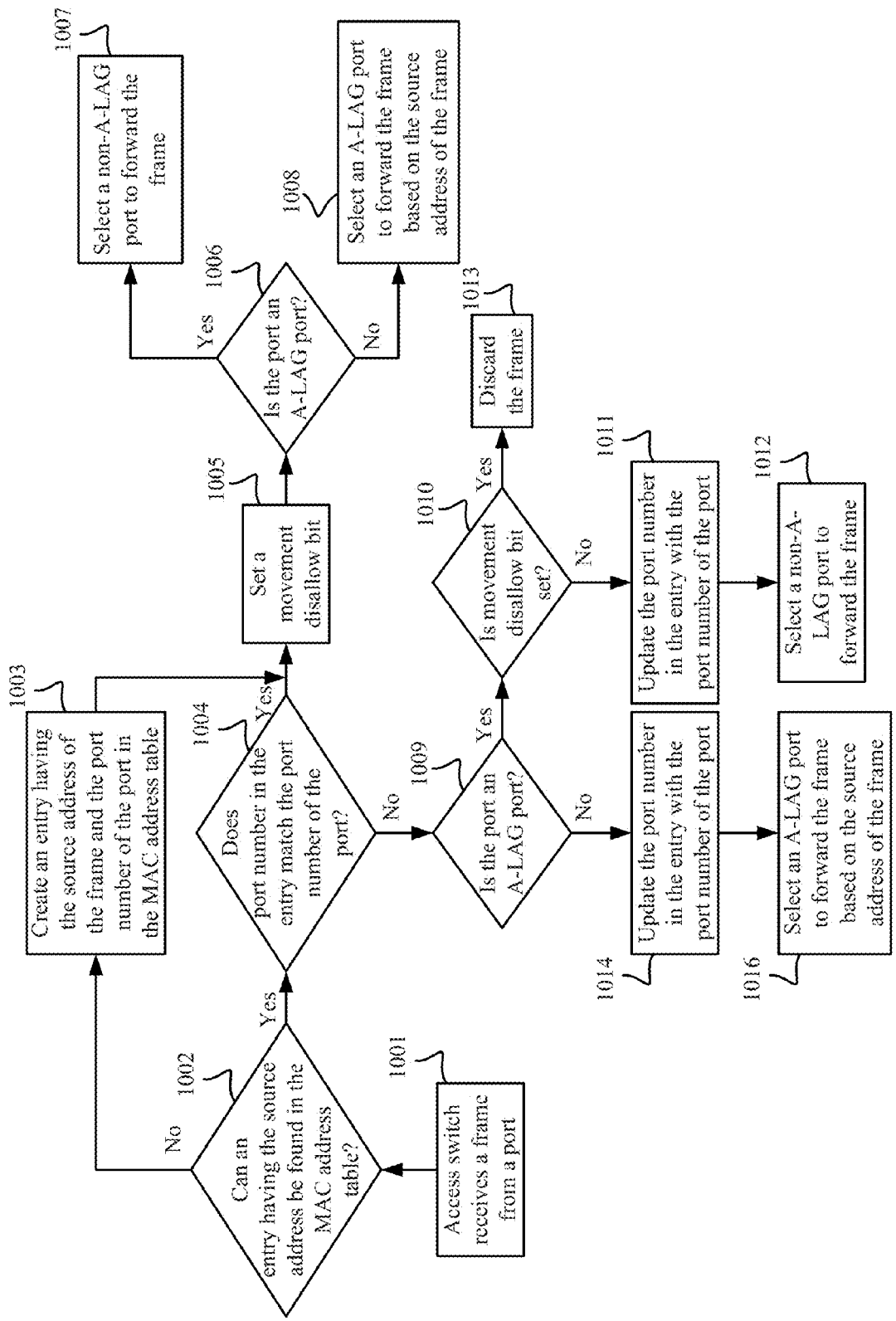
FIG. 10 is a schematic diagram illustrating a process performed by the access switch in response to receiving a frame according to yet another embodiment.

Referring to FIG. 10, a flow diagram of the process performed by the access switch in response to receiving a frame according to some further embodiments is shown. As shown, in step 1001, the access switch receives a frame from a port. Then in step 1002, the access switch determines whether an entry including the source address of the frame can be found in its MAC address table. In response to the determination of No, in step 1003, an entry including the source address of the frame and the port number of the port is created in the MAC address table, and the process proceeds to step 1005. In response to determining in step 1002 that an entry including the source address of the frame can be found in its MAC address table, in step 1004, the access switch further determines whether the port number in the entry found in the MAC address table matches the port number of the port. In response to determining that they match, the process proceeds to step 1005; in response to determining that they do not match, the process proceeds to step 1009. In step 1005, the access switch sets a movement disallow bit in the entry (newly created in step 1003 or found to be matching in step 1004). Then, in step 1006, the access switch determines whether the port is an A-LAG port. In response to the determination of Yes, in step 1007, the access switch selects a non-A-LAG port to forward the frame, for example, selecting one of the non-A-LAG ports based on the destination MAC address of the frame as an ordinary switch does. In response to the determination in step 1006 being No, in step 1008, an A-LAG port is selected to forward the frame based on the source address of the frame, as described above in detail with respect to step 808. In step 1009, the access switch determines whether the port from which the frame was received is an A-LAG port. In response to the determination of Yes, the process proceeds to step 1010; in response to the determination of No, the process proceeds to step 1014. In step 1010, the access switch determines whether the movement disallow bit in the entry is set. If it determines that the movement disallow bit is set, indicating that the port from which the frame was received being inconsistent with the port in the MAC address table entry is not caused by a port movement of the host, rather by the frame being a reflected frame, in step 1013, it discards the frame, without using the frame to perform MAC address learning, nor forwarding it. If in step 1010 it determines that the movement disallow bit is not set, indicating that the port from which the frame was received being inconsistent with the port in the MAC address table entry is caused by a port movement of the host, in step 1011, it uses the port number of the port to update the port number in the entry. Then, in step 1012, a non-A-LAG port is selected to forward the frame, for example, selecting one of the non-A-LAG ports based on the destination address of the frame as an ordinary switch does. In step 1014, the port number of the port from which the frame was received is used to update the port number in the entry. Then, in step 1015, the movement disallow bit is set in the entry. Then, in step 1016, an A-LAG port is selected based on the source address of the frame, as described above in detail with respect to step 808. In addition, in such an embodiment, there is further a separate process in the access switch, which periodically clears the movement disallow bit after the movement disallow bit is set in the entry of the MAC address table. The period may be configurable to suit different situations, and normally the period should be set to be greater that the maximum time required for the reflected frame to appear after the original frame is received, and smaller than the minimum time required for a frame with the same source address to appear on a different port due to the port movement of the host.

Figure 11:
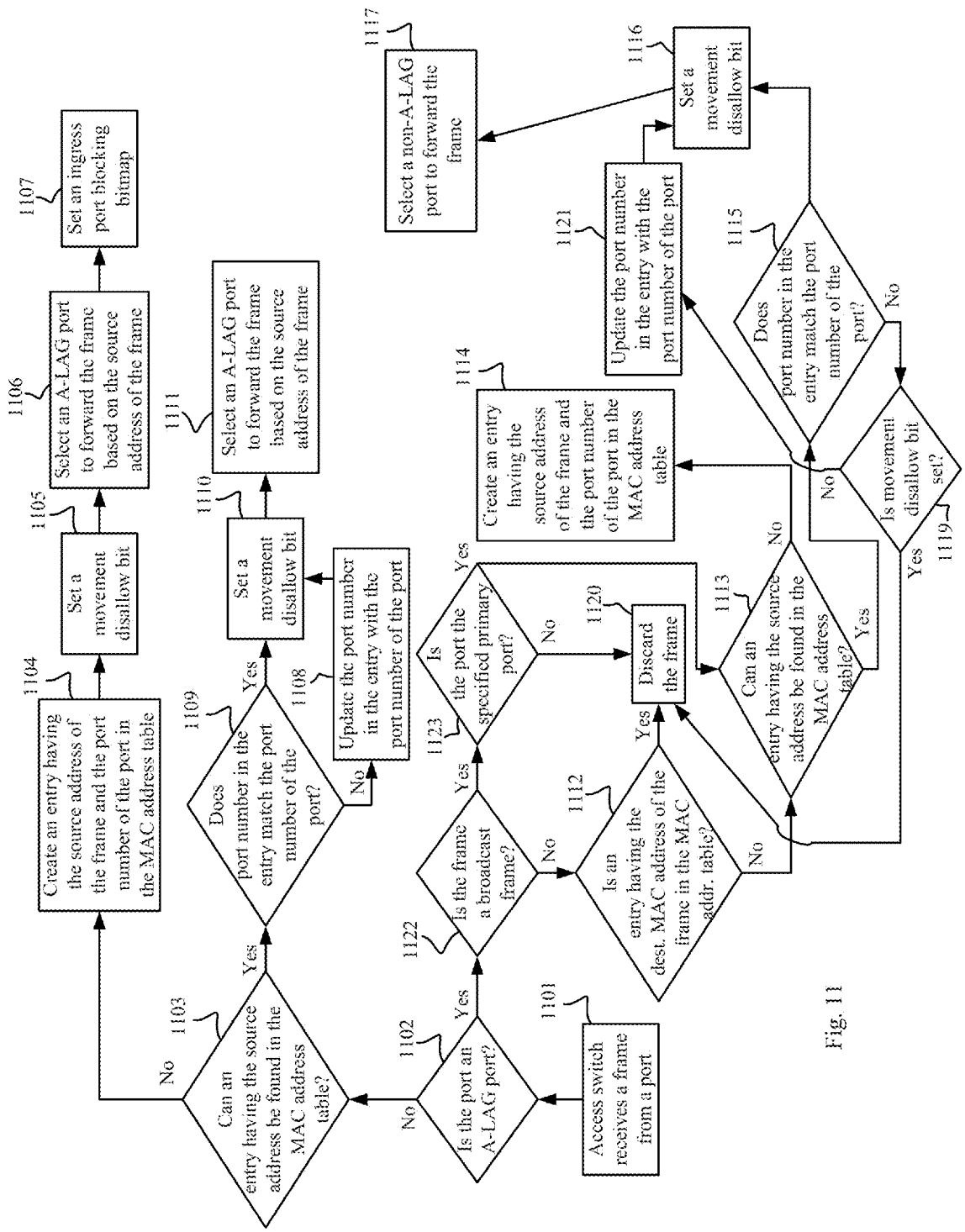
FIG. 11 is a schematic diagram illustrating a process performed by the access switch in response to receiving a frame according to a further embodiment.

Referring to FIG. 11, a flow diagram of the process performed by the access switch in response to receiving a frame according to some still further embodiments is shown. As shown, in step 1101, the access switch receives a frame from a port. Then in step 1102, the access switch determines whether the port is an A-LAG port. In response to determining that the port is an A-LAG port, the process proceeds to step 1122; in response to determining that the port is not an A-LAG port, the process proceeds to step 1103. In step 1103, the access switch determines whether an entry including the source address of the frame can be found in its MAC address table. In response to the determination of Yes, the process proceeds to step 1109; in response to the determination of No, the process proceeds to step 1104. In step 1104, an entry including the source address of the frame and the port number of the port is created in the MAC address table. Then, in step 1105, a movement disallow bit is set in the entry. Next, in step 1106, an A-LAG port is selected to forward to frame based on the source address of the frame, as described above in detail with respect to step 808. Next, in step 1107, an ingress port blocking bitmap is set in the entry, the ingress port blocking bitmap including a bit corresponding to each of the A-LAG ports of the access switch, the bit corresponding to the selected A-LAG port being not set, while the bits corresponding to the other A-LAG ports being set. As may be understood by those skilled in the art, it is also feasible that the bit corresponding to the selected A-LAG port is set, while the bits corresponding to the other A-LAG ports are set; in fact, the solution of the present invention only needs to set the two kinds of bits differently. In step 1109, the access switch further determines whether the port number in the entry found in the MAC address table matches the port number of the port from which the frame was received. In response to determining that they match, the process proceeds to step 1110; in response to determining that they do not match, the process proceeds to step 1108. In step 1108, the port number of the port is used to update the port number in the entry, and then the process proceeds to step 1110. In step 1110, a movement disallow bit is set in the entry. Then, in step 1111, an A-LAG port is selected to forward the frame based on the source address of the frame, as described above in detail with respect to step 808. In step 1122, the access switch determines whether the received frame is a broadcast frame. In response to the determination of Yes, the process proceeds to step 1123; in response to the determination of No, the process proceeds to step 1112. In step 1123, it is determined whether the port from which the frame is received is the specified primary port. In response to the determination of Yes, the process proceeds to step 1113; in response to the determination of No, in step 1120, the frame is discarded. In step 1112, the access switch determines whether an entry having the destination MAC address of the frame can be found in its MAC address table, and the bit in the ingress port blocking bitmap of the entry corresponding to the port is set. In response to the determination of Yes, in step 1120, the frame is discarded; in response to the determination of No, the process proceeds to step 1113. In step 1113, the access switch determines whether an entry including the source address of the frame can be found in the MAC address table. In response to the determination of No, the process proceeds to step 1114; in response to the determination of Yes, the process proceeds to step 1115. In step 1114, an entry including the source address of the frame and the port number of the port is created in the MAC address table, then the process proceeds to step 1116. In step 1115, the access switch determines whether the port number in the entry matches the port number of the port. If the determination is Yes, the process proceeds to step 1116; if the determination is No, the process proceeds to step 1119. In step 1119, the access switch determines whether the movement disallow bit in the entry is set. In response to the determination of Yes, in step 1120, the frame is discarded; in response to the determination of No, the process proceeds to step 1121. In step 1121, the port number of the port is used to update the port number in the entry, then the process proceeds to step 1116. In step 1116, a movement disallow bit is set in the entry. Then, in step 1117, a non-A-LAG port is selected to forward the frame.

Figure 12:
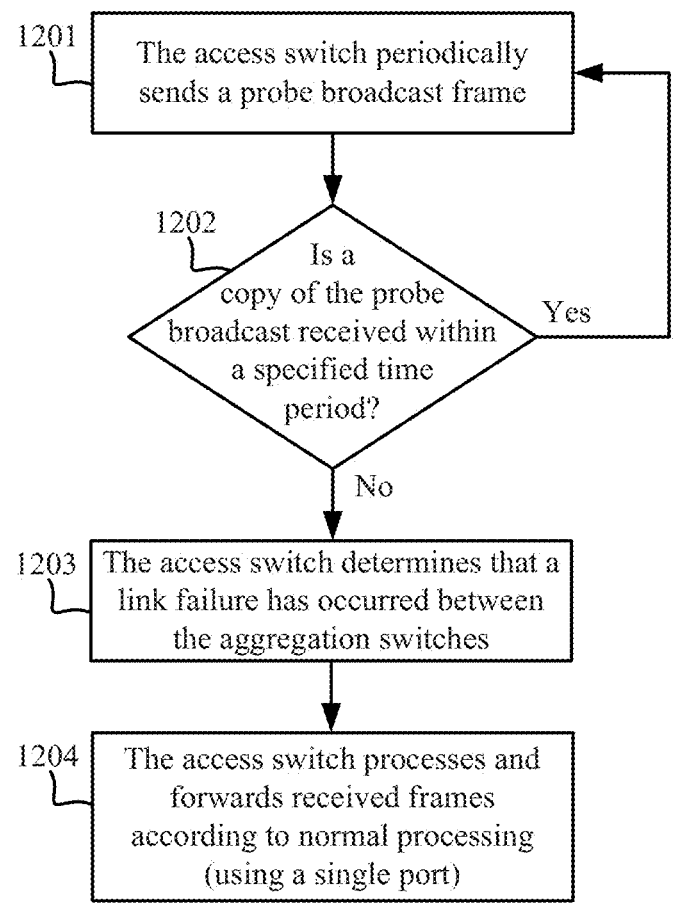
FIG. 12 is a flow diagram illustrating a process of checking a link failure between aggregation switches by the access switch according to one embodiment.

Referring to FIG. 12, a flow diagram of a process performed by the access switch for checking a link failure between the aggregation switches is shown. As shown, in step 1201, the access switch periodically sends a probe broadcast frame, which is unique among all the broadcast frames, from an A-LAG port. In step 1202, the access switch determines whether a copy of the probe broadcast frame is received within a specified time period. In response to the determination of Yes, the process returns to perform step 1201. In response to the determination of No, in step 1203, it determines that a link failure occurs between the aggregation switches. In step 1204, the access switch processes and forwards received frames as an ordinary switch does, that is, no longer viewing the A-LAG links to which the A-LAG ports are connected as forming a common A-LAG, and performing the special processing of the present invention, such as selecting an A-LAG port based on the source MAC address of a frame, etc., rather, viewing them as separate links, and performing ordinary processing as an ordinary switch does, such as selecting a port based on the destination address of a frame.

While some exemplary process flow of the access switch according to embodiments have been described above, it is to be noted that the above description is only illustration, rather than limitation to the present invention. In other embodiments, the process flow of the access switch may have more, less or different steps, and relationships of order, etc. among the steps may be different from described and illustrated. In addition, as known by those skilled in the art, the above description actually discloses a method and apparatus according to embodiments.

In one aspect of the present invention, there is provided a method for asymmetrical link aggregation, wherein the method is implemented in an access switch, the access switch connects to at least two aggregation switches through a first set of ports (i.e., A-LAG ports) and respective links, the access switch connects to an external network through a second set of ports (i.e., Non-A-LAG ports), and the at least two aggregation switches connects to an internal network, the method comprising: in response to receiving a frame from one of the second set of ports (see, e.g., 801 and the No branch of step 806 in FIG. 8, 901 and the No branch of 909 in FIG. 9, 1001 and the No branch of 1006 in FIG. 10, and 1101 and the No branch of 1102 in FIG. 11), selecting one of the first set of ports based on the source address of the frame (see, e.g., 808 in FIG. 8, 911 in FIG. 9, 1008 in FIG. 10, and 1111 in FIG. 11).

According to one embodiment, the method further comprises: in response to receiving a frame from one of the second set of ports, and there being no entry including the source address of the frame in the MAC address table of the access switch (see, e.g., the No branch of 802 in FIG. 8, the No branch of 902 in FIG. 9, the No branch of 1002 in FIG. 10, and the No branch of 1103 in FIG. 11), creating an entry including the source address of the frame in the MAC address table (see, e.g., 803 in FIG. 8, 903 in FIG. 9, 1003 in FIG. 10, and 1104 in FIG. 11); and in response to receiving a frame from one of the second set of ports, there being an entry including the source address of the frame in the MAC address table of the access switch, and the port number in the entry not matching the port number of the port of the frame (see, e.g., the No branch of 804 in FIG. 8, the No branch of 904 in FIG. 9, the No branch of 1004 in FIG. 10, and the No branch of 1109 in FIG. 11), updating the entry in the MAC address table using the port number of the port of the frame (see, e.g., 805 in FIG. 8, 907 in FIG. 9, 1014 in FIG. 10, and 1108 in FIG. 11).

According to one embodiment, the method further comprises: in response to receiving a frame from one of the first set of ports (see, e.g., 901 and the Yes branch of 905 in FIG. 9, 1001 and the Yes branch of 1009 in FIG. 10, and 1101 and the Yes branch of 1102 in FIG. 11), there being an entry including the source address of the frame in the MAC address table of the access switch (see, e.g., the Yes branch of 902 in FIG. 9, the Yes branch of 1002 in FIG. 10, and the Yes branch of 1113 in FIG. 11), and the port number in the entry not matching the port number of the port of the frame (see, e.g., the No branch of 904 in FIG. 9, the No branch of 1004 in FIG. 10, and the No branch of 1115 in FIG. 11), discarding the frame (see, e.g., 906 in FIG. 9, 1013 in FIG. 10, and 1120 in FIG. 11).

According to one embodiment, the method further comprises: in response to receiving a frame from a port (see, e.g., 1001 in FIG. 10, and 1101 in FIG. 11), and there being an entry including the source address of the frame in the MAC address table of the access switch (see, e.g., the No branch of 1002 and 1003 in FIG. 10, and the No branch of 1103, 1104, the No branch of 1113 and 1114 in FIG. 11; and the Yes branch of 1002 and 1004 in FIG. 10, and the Yes branch of 1103, the Yes branch of 1109, the Yes branch of 1113 and 1115 in FIG. 11), setting a movement disallow bit in the entry (see, e.g., 1005 in FIG. 10, and 1110, 1116 in FIG. 11); and in response to receiving a frame from one of the first set of ports (see, e.g., 1001 and the Yes branch of 1009 in FIG. 10, and 1101 and the Yes branch of 1102 in FIG. 11), there being an entry including the source address of the frame in the MAC address table but the port number in the entry not matching the port number of the port of the frame (see, e.g., the Yes branch of 1002 and the No branch of 1004 in FIG. 10, and the Yes branch of 1113, and the No branch of 1115 in FIG. 11), and in response to the movement disallow bit having been set in the entry (see, e.g., the Yes branch of 1010 in FIG. 10, and the Yes branch of 1119 in FIG. 11), discarding the frame (see, e.g., 1013 in FIG. 10, and 1120 in FIG. 11), and in response to the movement disallow bit having not been set in the entry (see, e.g., the No branch of 1010 in FIG. 10, and the No branch of 1119 in FIG. 11), updating the entry using the port number of the port of the frame (see, e.g., 1011 in FIG. 10, and 1121 in FIG. 11); wherein, the movement disallow bit is reset periodically.

According to one embodiment, in response to receiving a frame from one of the second set of ports (see, e.g., 1101 and the No branch of 1102 in FIG. 11), setting an ingress port blocking bitmap in the entry of the MAC address table (see, e.g., 1107 in FIG. 11), the ingress port blocking bitmap including a bit corresponding to each port in the first set of ports, wherein, the bit corresponding to the port selected for sending the frame is not set, and the bits corresponding the other ports in the first set of ports are set; and in response to receiving a frame from one of the first set of ports (see, e.g., 1101 and the Yes branch of 1102 in FIG. 11), the destination address of the frame matching the source address in an entry of the MAC address table, and the bit corresponding to the port in the ingress port blocking bitmap of the entry being set (see, e.g., the Yes branch of 1112 in FIG. 11), the frame is discarded.

According to some other embodiments, the method further comprises: in response to receiving a frame from one of the first set of ports (see, e.g., 1101 and the Yes branch of 1102 in FIG. 11), the frame being a broadcast frame (see, e.g., the Yes branch of 1122 in FIG. 11), and the port being not a specified primary port (see, e.g., the No branch of 1123 in FIG. 11), discarding the frame (see, e.g., 1120 in FIG. 11).

According to a further embodiment, an aging timer for MAC address entries in the access switch is set to be longer than aging timers for MAC address entries in the aggregation switches.

According to one embodiment, the method further comprises: sending a probe broadcast frame periodically from one of the first set of ports (see, e.g., 1201 in FIG. 12), the probe broadcast frame being defined uniquely among all the broadcast frames; and in response to not receiving the broadcast frame from another port in the first set of ports within a specified time period (see, e.g., the No branch of 1202 in FIG. 12), determining that a link failure occurs between the aggregation links (see, e.g., 1203 in FIG. 12), and processing and forwarding the received frame as an ordinary switch does (see, e.g., 1204 in FIG. 12).

According to one embodiment, the method further comprises: storing the source address of the frame and the port number of the selected port in a mapping table in the access switch.

According to one embodiment, the method further comprises: in response to detecting a link change, based on each stored source address, re-selecting one of the first set of ports, generating a fake frame including the source address, and sending the fake frame from the selected port.

In another aspect of the present invention, there is provided an apparatus for asymmetrical link aggregation, wherein the apparatus is implemented in an access switch, the access switch connects to at least two aggregation switches through a first set of ports and respective links, the access switch connects to an external network through a second set of ports, and the at least two aggregation switches connects to an internal network, the apparatus comprising: means for, in response to receiving a frame from one of the second set of ports, selecting one of the first set of ports based on the source address of the frame; and means for sending the frame using the selected one of the first set of ports.

According to one embodiment, the apparatus further comprises: logic configured to, in response to receiving a frame from one of the second set of ports, and there being no entry including the source address of the frame in the MAC address table of the access switch, create an entry including the source address of the frame in the MAC address table; and logic configured to, in response to receiving a frame from one of the second set of ports, there being an entry including the source address of the frame in the MAC address table of the access switch, and the port number in the entry not matching the port number of the port of the frame, update the entry in the MAC address table using the port number of the port of the frame.

According to one embodiment, the apparatus further comprises: logic configured to, in response to receiving a frame from one of the first set of ports, there being an entry including the source address of the frame in the MAC address table of the access switch, and the port number in the entry not matching the port number of the port of the frame, discard the frame.

According to one embodiment, the apparatus further comprises: logic configured to, in response to receiving a frame from a port, and there being an entry including the source address of the frame in the MAC address table of the access switch, set a movement disallow bit in the entry; and logic configured to, in response to receiving a frame from one of the first set of ports, there being an entry including the source address of the frame in the MAC address table but the port number in the entry not matching the port number of the port of the frame, and in response to the movement disallow bit having been set in the entry, discard the frame, and in response to the movement disallow bit having not been set in the entry, update the entry using the port number of the port of the frame; and logic configured to periodically reset the movement disallow bit.

According to one embodiment, in response to receiving a frame from one of the second set of ports, an ingress port blocking bitmap in the entry of the MAC address table is set, the ingress port blocking bitmap including a bit corresponding to each port in the first set of ports, wherein, the bit corresponding to the port selected for sending the frame is not set, and the bits corresponding the other ports in the first set of ports are set; and in response to receiving a frame from one of the first set of ports, the destination address of the frame matching the source address in an entry of the MAC address table, and the bit corresponding to the port in the ingress port blocking bitmap of the entry being set, the frame is discarded.

According to one embodiment, an aging timer for MAC address entries in the access switch is set to be longer than aging timers for MAC address entries in the aggregation switches.

According to one embodiment, the apparatus further comprises: logic configured to, in response to receiving a frame from one of the first set of ports, the frame being a broadcast frame, and the port being not a specified primary port, discard the frame.

According to one embodiment, the apparatus further comprises: logic configured to send a probe broadcast frame periodically from one of the first set of ports, the probe broadcast frame being defined uniquely among all the broadcast frames; and logic configured to, in response to not receiving the broadcast frame from another port in the first set of ports within a specified time period, determine that a link failure occurs between the aggregation links, and process and forward the received frame as an ordinary switch does.

According to an embodiment, the apparatus further comprises: logic configured to store the source address of the frame and the port number of the selected port in a mapping table in the access switch.

According to an embodiment, the apparatus further comprises: logic configured to, in response to detecting a link change, based on each stored source address, re-select one of the first set of ports, generate a fake frame including the source address, and send the fake frame from the selected port.

Some preferable embodiments have been described in detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 13:
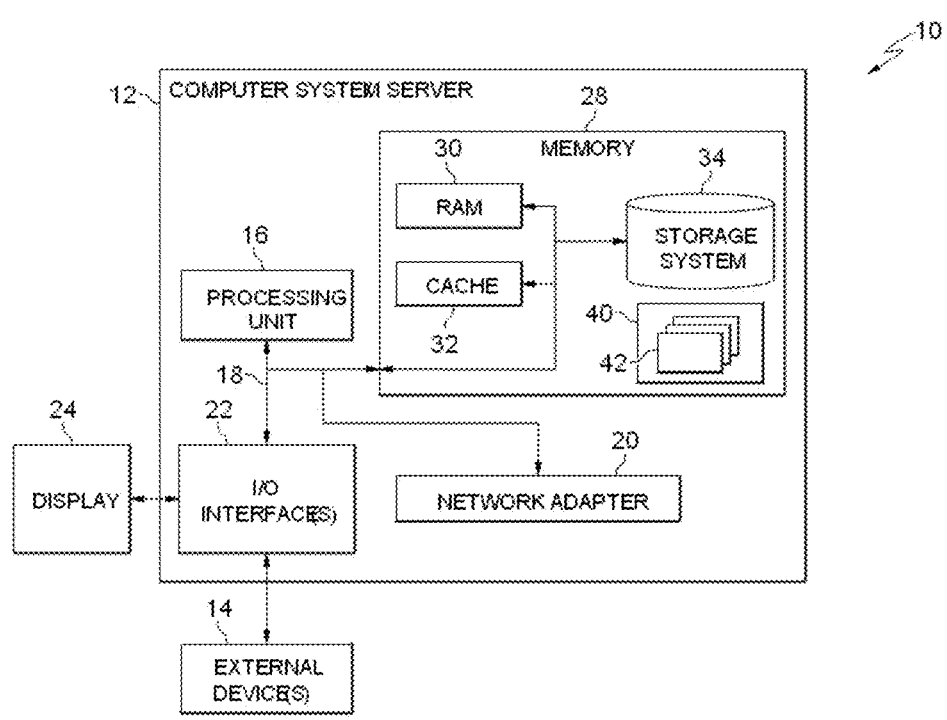
FIG. 13 is block diagram of exemplary computer system applicable to implement embodiments.

Referring now to FIG. 13, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 13, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for asymmetrical link aggregation, wherein the method is implemented in an access switch, wherein the access switch is connected to at least two aggregation switches through a first set of ports and respective links, wherein the access switch is connected to an external network through a second set of ports, and wherein the at least two aggregation switches are connected to an internal network, the method comprising:
   in response to receiving a frame from one of the second set of ports, selecting one of the first set of ports based on a source address of the frame according to a distribution algorithm that ensures that all frames with a given source address are forwarded using a single port, the distribution algorithm causing frames with different source addresses to be distributed uniformly among the first set of ports;
   sending the frame using the selected one of the first set of ports; and
   in response to detecting a link change corresponding to the selected one of the first set of ports, re-selecting one of the first set of ports according to the distribution algorithm, generating a fake reverse address resolution protocol (RARP) frame including the source address of the frame, and sending the fake RARP frame from the re-selected one of the first set of ports,
   wherein the distribution algorithm comprises a hashing operation that is applied to a source media access control (MAC) address to obtain a corresponding port number, and wherein the distribution algorithm causes symmetrical load balancing to frames received at the first set of ports and at the second set of ports.

2. The method according to claim 1, further comprising:
   in response to receiving a frame from one of the second set of ports, and there being no entry including the source address of the frame in a media access control (MAC) address table of the access switch, creating an entry including the source address of the frame in the MAC address table; and
   in response to receiving a frame from one of the second set of ports, there being an entry including the source address of the frame in the MAC address table of the access switch, and a port number in the entry not matching a port number of the port of the frame, updating the entry in the MAC address table using the port number of the port of the frame.

3. The method according to claim 1, further comprising:
   in response to receiving a frame from one of the first set of ports, there being an entry including a source address of the frame in a media access control (MAC) address table of the access switch, and a port number in the entry not matching a port number of the port of the frame, discarding the frame.

4. The method according to claim 1, further comprising:
   in response to receiving a frame from a port, and there being an entry including a source address of the frame in a media access control (MAC) address table of the access switch, setting a movement disallow bit in the entry; and
   in response to receiving a frame from one of the first set of ports, there being an entry including the source address of the frame in the MAC address table but a port number in the entry not matching a port number of the port of the frame, and in response to the movement disallow bit having been set in the entry, discarding the frame; and
   in response to the movement disallow bit having not been set in the entry, updating the entry using the port number of the port of the frame, wherein the movement disallow bit is reset periodically.

5. The method according to claim 4, wherein,
   in response to receiving a frame from one of the second set of ports, setting an ingress port blocking bitmap in the entry of the MAC address table, the ingress port blocking bitmap including a bit corresponding to each port in the first set of ports, wherein, the bit corresponding to the port selected for sending the frame is not set, and setting the bits corresponding to other ports in the first set of ports; and
   in response to receiving a frame from one of the first set of ports, a destination address of the frame matching the source address in an entry of the MAC address table, and the bit corresponding to the port in the ingress port blocking bitmap of the entry being set, discarding the frame, wherein an aging timer for MAC address entries in the access switch is set to be longer than aging timers for MAC address entries in the aggregation switches.

6. The method according to claim 4, further comprising:
in response to receiving a frame from one of the first set of ports, the frame being a broadcast frame, and the port being not a specified primary port, discarding the frame.

7. The method according to claim 1, further comprising:
sending a probe broadcast frame periodically from one of the first set of ports, the probe broadcast frame being defined uniquely among all the broadcast frames; and
in response to not receiving the broadcast frame from another port in the first set of ports within a specified time period, determining that a link failure occurs between the aggregation links, and processing and forwarding the received frame using a single port.

8. The method according to claim 1, further comprising:
storing a source address of the frame and a port number of the selected port in a mapping table in the access switch.

9. The method according to claim 8, further comparing:
in response to detecting the link change corresponding to the selected one of the first set of ports, updating the mapping table in the access switch with a port number of the re-selected one of the first set of ports.

10. An apparatus for asymmetrical link aggregation, wherein the apparatus is implemented in an access switch, the access switch connects to at least two aggregation switches through a first set of ports and respective links, the access switch connects to an external network through a second set of ports, and the at least two aggregation switches connect to an internal network, the apparatus comprising:
logic configured to maintain a media access control (MAC) address table in the access switch, wherein an aging timer for MAC address entries in the access switch is set to be longer than aging timers for MAC address entries in MAC address tables of the at least two aggregation switches;
logic configured to, in response to receiving a frame from one of the second set of ports, select one of the first set of ports based on a source address of the frame according to a distribution algorithm that ensures that all frames with a given source address are forwarded using a single port, the distribution algorithm causing frames with different source addresses to be distributed uniformly among the first set of ports, wherein the distribution algorithm comprises a hashing operation that is applied to a source MAC address to obtain a corresponding port number, and wherein the distribution algorithm causes symmetrical load balancing to frames received at the first set of ports and at the second set of ports; and
logic configured to send the frame using the selected one of the first set of ports.

11. The apparatus according to claim 10, further comprising:
logic configured to, in response to receiving a frame from one of the second set of ports, and there being no entry including a source address of the frame in the MAC address table of the access switch, create an entry including the source address of the frame in the MAC address table; and
logic configured to, in response to receiving a frame from one of the second set of ports, there being an entry including the source address of the frame in the MAC address table of the access switch, and a port number in the entry not matching a port number of the port of the frame, update the entry in the MAC address table using the port number of the port of the frame.

12. The apparatus according to claim 10, further comprising:
logic configured to, in response to receiving a frame from one of the first set of ports, there being an entry including a source address of the frame in the MAC address table of the access switch, and a port number in the entry not matching a port number of the port of the frame, discard the frame.

13. The apparatus according to claim 10, further comprising:
logic configured to, in response to receiving a frame from a port, and there being an entry including a source address of the frame in the MAC address table of the access switch, set a movement disallow bit in the entry; and
logic configured to, in response to receiving a frame from one of the first set of ports, there being an entry including the source address of the frame in the MAC address table but a port number in the entry not matching a port number of the port of the frame, and in response to the movement disallow bit having been set in the entry, discard the frame;
logic configured to, in response to the movement disallow bit having not been set in the entry, update the entry using the port number of the port of the frame; and
logic configured to periodically reset the movement disallow bit.

14. The apparatus according to claim 13, further comprising:
logic configured to, in response to receiving a frame from one of the second set of ports, set an ingress port blocking bitmap in the entry of the MAC address table, the ingress port blocking bitmap including a bit corresponding to each port in the first set of ports, wherein the bit corresponding to the port selected for sending the frame is not set, and wherein bits corresponding to other ports in the first set of ports are set; and
in response to receiving a frame from one of the first set of ports, a destination address of the frame matching the source address in an entry of the MAC address table, and the bit corresponding to the port in the ingress port blocking bitmap of the entry being set, logic configured to discard the frame.

15. The apparatus according to claim 14, further comprising:
logic configured to, in response to receiving a frame from one of the first set of ports, the frame being a broadcast frame, and the port being not a specified primary port, discard the frame;
logic configured to send a probe broadcast frame periodically from one of the first set of ports, the probe broadcast frame being defined uniquely among all the broadcast frames;
logic configured to, in response to not receiving the broadcast frame from another port in the first set of ports within a specified time period, determine that a link failure occurs between the aggregation links, and process and forward the received frame using a single port;
logic configured to store a source address of the frame and a port number of the selected port in a mapping table in the access switch; and
logic configured to, in response to detecting a link change corresponding to the selected one of the first set of ports:

re-select one of the first set of ports;
generate a fake reverse address resolution protocol (RARP) frame including the source address of the frame;
send the fake RARP frame from the re-selected one of the first set of ports; and
update the mapping table in the access switch with a port number of the re-selected one of the first set of ports.

16. The apparatus according to claim 13, further comprising:
logic configured to, in response to receiving a frame from one of the first set of ports, the frame being a broadcast frame, and the port being not a specified primary port, discard the frame.

17. The apparatus according to claim 10, further comprising:
logic configured to send a probe broadcast frame periodically from one of the first set of ports, the probe broadcast frame being defined uniquely among all the broadcast frames; and
logic configured to, in response to not receiving the broadcast frame from another port in the first set of ports within a specified time period, determine that a link failure occurs between the aggregation links, and process and forward the received frame using a single port.

18. The apparatus according to claim 10, further comprising:
logic configured to store a source address of the frame and a port number of the selected port in a mapping table in the access switch.

19. The apparatus according to claim 18, further comprising:
logic configured to, in response to detecting a link change, based on each stored source address, re-select one of the first set of ports, generate a fake reverse address resolution protocol (RARP) frame including the source address, and send the fake RARP frame from the selected port.

* * * * *